Nov. 9, 1965    C. D. P. SMALLPEICE    3,216,451
ANNULAR SEALING RING CONTROL VALVE
Filed Oct. 7, 1963

United States Patent Office 3,216,451
Patented Nov. 9, 1965

3,216,451
ANNULAR SEALING RING CONTROL VALVE
Cosby Donald Philipps Smallpeice, Swanwick Shore, near Southampton, England, assignor to Martonair Limited, Parkshot, Richmond, Surrey, England
Filed Oct. 7, 1963, Ser. No. 314,122
8 Claims. (Cl. 137—608)

The invention relates to a valve of the kind which is adapted to regulate a fluid flow in one direction in dependence on the difference in the pressure acting on opposite sides of its movable member. An object of the invention is an improved form of valve of this kind.

According to the invention a valve of the kind set forth has a fluid inlet into an annular flow passage defined by an outer wall and by an inner wall whose surface diverges radially in the said one direction such that the cross-section of the passage diminishes progressively in the said one direction to a point where the inner and outer walls coincide, a fluid outlet from said annular flow passage arranged axially remote from said fluid inlet, an annular sealing ring which is resiliently expansible circumferentially and is normally supported by the inner wall in a position in which said fluid inlet communicates with said fluid outlet, whereby a pressure difference acting in the said one direction will urge the sealing ring axially in that direction on to a larger-diameter zone of the inner wall so that the consequent circumferential expansion of the ring will regulate the flow of fluid in the said one direction in dependence on the said pressure difference acting in that direction. Thus, as the pressure difference in the said one direction increases, the flow through the annular flow passage will become progressively restricted until, finally, the ring effects a seal between the inner wall and the adjacent outer wall of the passage to cut off the flow through the fluid outlet. When the direction of the pressure difference is reversed the ring will be lifted from its sealing position and the flow will be unrestricted.

According to a further feature the surface of the inner wall may additionally diverge radially in the opposite direction from the normal position of the sealing ring such that the cross-section of the annular flow passage also diminishes progressively in the said opposite direction to a point where the inner and outer walls coincide, whereby a pressure difference acting in said other direction will urge the sealing ring axially in that direction on to a larger-diameter zone of the inner wall so that the consequent circumferential expansion of the ring will also regulate the flow of fluid in the said other direction in dependence on the pressure difference acting in that direction.

According to a still further feature the outer wall may diverge radially inwardly from a point adjacent the normal position of the sealing ring to the point where it coincides with the inner wall.

According to another feature the outer wall of the annular flow passage may be defined by a tube having a bell-mouth providing the said fluid inlet, the inner wall is defined by a tubular member having cylindrical ends of different diameters separated by a frusto-conical zone, the smaller cylindrical end effects a seal with a cylindrical core arranged coaxially within the said tube, the larger cylindrical end effects a seal with the tube remote from its bell-mouth, the tubular member is arranged so that the frusto-conical zone is radially-aligned with the bell-mouth, the frusto-conical zone is separated from the larger cylindrical end by a cylindrical portion of smaller diameter than the bore of the tube, the fluid outlet comprises a port in the tubular member communicating with the space between the tube and the said cylindrical portion, and the sealing member is arranged for co-operation with the frusto-conical zone and is adaped to be moved by an appropriate pressure difference so that the consequent circumferential expansion of the ring will cause the latter to engage the outer wall and thereby check fluid flow from the bell-mouth to the port.

Figure 1:
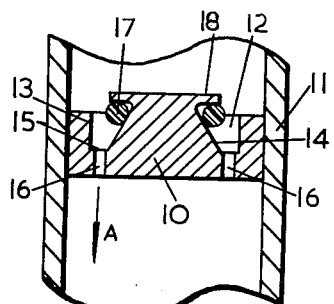
FIGURES 1 to 3 are similar axial sections through one type of valve illustrating its operation.
Figure 2:
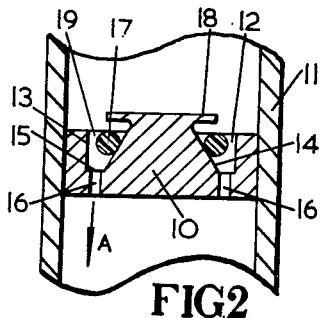
Figure 3:
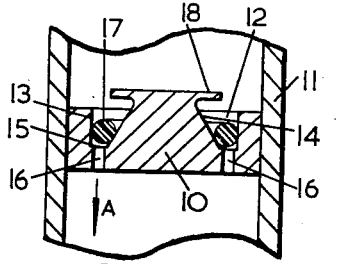

Referring first to FIGURES 2 to 3 the valve is formed by a cylindrical plug 10 which is arranged in sealing engagement with the bore of a pipe 11 for conveying fluid in either axial direction. An annular groove 12, constituting an annular flow passage, is formed in one axial side of the plug 10 and is bounded by a cylindrical outer wall 13 and by a frusto-conical inner wall 14 which coincide at a radial face 15. The cross-section of the groove 12 diminishes progressively from its mouth, which serves as a fluid inlet when the fluid flow is in the direction of arrow A, to the face 15 which is provided with a series of axially-directed ports 16 serving as fluid outlets. A resilient rubber sealing ring 17 is arranged over the inner wall 14 and normally occupies the position shown in FIGURE 1 in which it is retained by an annular flange 18 of the plug 10.

In operation the ring 17 occupies the position shown in FIGURE 1 for very low fluid flow in the direction of arrow A, the fluid passing the plug 10 by entering the groove 12 between the outer wall 13 and the ring 17 and by passing through ports 16. However, when the flow increases in the direction of arrow A, a pressure difference is generated on the opposite axial faces of the ring 17 and the resultant force generated on the ring 17 is in the direction of arrow A. This force causes the ring to move axially along the conical portion of the inner wall 14 with a resultant circumferential expansion, as will be appreciated from FIGURE 2, which will reduce the cross-section of the annular path 19 between the outer wall 13 and the periphery of the ring 16 and will accordingly regulate the flow of fluid. The ring 17 will continue to move axially as the pressure difference across it increases until its periphery eventually engages the outer wall and flow is stopped completely, this condition being shown in FIGURE 3. If the flow of fluid is reversed, the ring 17 will contract and return to the position shown in FIGURE 1 and the ring will have no regulating effect on the flow.

Figure 4:
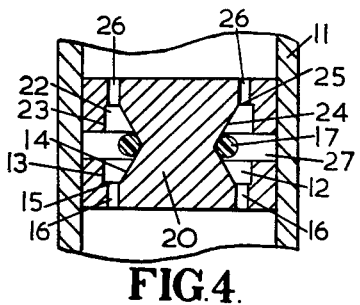
FIGURE 4 is an axial section through another type of valve.

If it is desired to regulate the flow of fluid in both directions the construction illustrated in FIGURE 4 may be employed. In that figure the bottom portion of the plug 20 is identical with the plug 10 of FIGURES 1 to 3 with the exception that the flange 18 is omitted. The top portion of plug 20 is a mirror image of the bottom so that it is provided with an annular groove 22 bounded by an outer wall 23 and by a frusto-conical inner wall 24 which coincide at a radial face 25. Axially-directed ports 26 are provided in face 25 and serve as fluid inlets or exhausts according to the direction of flow. The cylindrical face of the plug 20 is provided with a radial groove 27 communicating with the annular grooves 12 and 22 which are formed as undercuts. The frusto-conical inner walls 14 and 24 meet at a mutually minimum cross-section immediately below the groove 27 and support a common resilient rubber sealing ring 17 which is shown in its static position and would be introduced into the plug through groove 27. The valve operates in precisely the same manner as described with reference to FIGURES 1 to 3 excepting that it will regulate a flow in either direction.

Figure 5:
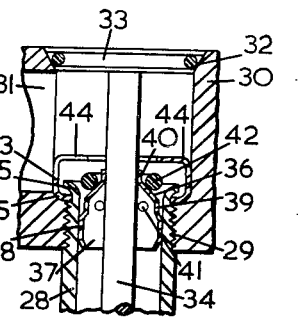
FIGURE 5 is an axial section through a further type of valve.

Referring now to FIGURE 5, a tube 28 has a threaded connection 29 with a casing member 30 provided with a port 31 and a port 32 controlled by a poppet valve 33 having an operating stem 34. The annular flow passage is defined by a bell-mouth 35 of the tube 28 and by a frusto-conical zone 36 of a tubular member 37 of which a cylindrical end 38 is a push fit into the bore of tube 28. The frusto-conical zone 36 is separated from the cylindrical end 38 by a cylindrical portion 39 of smaller diameter than the bore of the tube, and is formed at its narrowest cross-section with a cylindrical end 40 which effects a seal with the valve stem 34 and additionally serves as a guide for the latter. A series of ports 41 are arranged in the cylindrical portion 39 and provide a fluid communication between the ports 31 and 33 and the bore of tube 28. A resilient rubber sealing ring 42 is arranged over the cylindrical end 40 and is retained by a cup 43 which has in-turned fingers 44 and has a radial flange 45 which is located by the bell-mouth 35. The operation of this valve is similar to that of the valve illustrated in FIGURES 1 to 3, the ring 42 regulating the flow of fluid from ports 31 or 32 through ports 41 to the bore of pipe 28, but having no effect on flow in the reverse direction. It will be appreciated, however, that the bell-mouth 35 will cause the valve to have different regulating characteristics than those of the valve shown in FIGURES 1 to 3 in which the outer wall 13 is of cylindrical configuration.

What I claim as my invention and desire to secure by Letters Patent of the United States is:

1. A valve comprising a body defining the wall of a fluid flow passage, a plug having two axial faces separated by a peripheral wall corresponding to the said wall of the fluid flow passage, said plug arranged inside said fluid flow passage with said peripheral wall in sealing engagement with said wall of the fluid flow passage, said plug formed with an annular flow passage in one of said axial faces, said annular flow passage defined by an outer wall and by an inner wall whose surface diverges radially from said one axial face towards the other said axial face such that the cross-section of said annular flow passage diminishes progressively to a point intermediate the said two axial faces where the said inner wall joins the said outer wall, said plug formed with a port in said other axial face, said port communicating with said annular flow passage remote from said one axial face, a toroidal annular sealing ring which is resiliently expansible circumferentially and is supported by the said inner wall, said annular sealing ring adapted to engage said inner wall in a position adjacent the said one axial face, the radial thickness of the said annular sealing ring less than the radial spacing between the said inner wall and the said outer wall at the said position so that fluid can flow in either direction between the said annular sealing ring and the said outer wall, and said annular sealing ring adapted to move axially from said position towards said point in response to a pressure difference generated on the axial faces of the said annular sealing ring when fluid flows in the direction from said annular flow passage through said port, whereby said annular sealing ring will move axially with consequent circumferential expansion towards said outer wall due to the interaction between said inner wall and said annular sealing ring and will reduce the distance between said annular sealing ring and said outer wall to regulate the flow of fluid in the said direction.

2. A valve as in claim 1 in which the said outer wall diverges radially inwardly from said one axial face to the said point.

3. A valve comprising a body defining the wall of a fluid flow passage, a plug having two axial faces separated by a peripheral wall corresponding to the said wall of the fluid flow passage, said plug arranged inside said fluid flow passage with said peripheral wall in sealing engagement with said wall of the fluid flow passage, said plug formed with an annular flow passage between said two axial faces, said annular flow passage defined by an outer wall and by an inner wall whose surface diverges radially from a position intermediate said two axial faces towards both said axial faces such that the cross-section of said annular flow passage diminishes progressively from said position to a first point intermediate said position and one of said axial faces and to a second point intermediate said position and the other of said axial faces, said inner wall arranged to join the said outer wall at both said points, said plug formed with a first port in said one axial face, said first port communicating with said annular flow passage adjacent said first point, said plug formed with a second port in said other axial face, said second port communicating with said annular flow passage adjacent said second point, an annular sealing ring which is resiliently expansible circumferentially and is supported by the said inner wall, said annular sealing ring adapted to engage said inner wall in the said position, the radial thickness of the said annular sealing ring less than the radial spacing between the said inner wall and the said outer wall at the said position so that fluid can flow in either direction between the said annular sealing ring and the said outer wall, said annular sealing ring adapted to move axially from said position towards said first point in response to a pressure difference generated on the axial faces of the said annular sealing ring when fluid flows in the direction from said annular flow passage through said first port, and said annular sealing ring adapted to move axially from said position towards said second point in response to a pressure difference generated on the axial faces of the said annular sealing ring when fluid flows in the direction from said annular flow passage through said second port, whereby said annular sealing ring will move axially with consequent circumferential expansion towards said outer wall due to the interaction between said inner wall and said annular sealing ring and will reduce the distance between said annular sealing ring and said outer wall to regulate the flow of fluid in either of said directions.

4. A valve as in claim 3 in which the said outer wall diverges radially inwardly from adjacent the said position towards both said first point and said second point.

5. A valve comprising a tube of which the bore defines the wall of a fluid flow passage, a tubular member having cylindrical ends of different diameters separated by a frusto-conical zone, said tubular member arranged inside said fluid flow passage with the larger said cylindrical end in sealing engagement with said wall of the fluid flow passage, a cylindrical core arranged coaxially within said tubular member, the smaller said cylindrical end in sealing engagement with said cylindrical core, said tubular member formed with a cylindrical zone intermediate said frusto-conical zone and said larger cylindrical end, said cylindrical zone of smaller diameter than said bore to define an annular space between said bore and said cylindrical zone, said tubular member formed with a port communicating between said annular space and said bore adjacent said larger cylindrical end, said frusto-conical zone and said bore defining an annular flow passage, an annular sealing ring which is resiliently expansible circumferentially and is supported by said tubular member, said annular sealing ring adapted to engage said frusto-conical zone in a position adjacent said smaller cylindrical end, the radial thickness of the said annular sealing ring less than the radial spacing between said frusto-conical zone and said bore at the said position so that fluid can flow in either direction between the said annular sealing ring and the said bore, and said annular sealing ring adapted to move axially from said position towards said port in response to a pressure difference generated on the axial faces of the said annular sealing ring when fluid flows in the direction from said annular flow passage through said port, whereby said annular sealing ring will move axially with consequent circumferential expansion towards said bore due to the interaction between said frusto-conical zone and said annular sealing ring and will reduce the distance between said annular sealing ring and said bore to regulate the flow of fluid in the said direction.

6. A valve as in claim 5 comprising a body defining a valve seat and a second bore coaxial with said valve seat, said body further defining a passage provided with said valve seat, a fluid flow control valve comprising a stem and a head adapted sealingly to engage said valve seat, said stem coaxial with said second bore, said stem constituting said cylindrical core, said smaller cylindrical end of said tubular member supporting said stem for reciprocation relatively to said body, said stem adapted to be reciprocated whereby to move said head from a position in which said head sealingly engages said valve seat to a position in which said head is spaced from said valve seat to allow fluid to flow through said passage, the said tube arranged in sealing engagement with said second bore, the said cylindrical core adapted to be moved axially relatively to the said smaller cylindrical end, and said cylindrical core connected to said stem whereby said control valve is operable from within the said tube remote from said valve seat and said tubular member.

7. A valve comprising a tube of which the bore defines the wall of a fluid flow passage, said tube is formed at one axial end with a bell-mouth, a tubular member having cylindrical ends of different diameters separated by a frusto-conical zone, said tubular member arranged inside said fluid flow passage with the larger said cylindrical end in sealing engagement with said wall of the fluid flow passage and with said frusto-conical zone radially-aligned with said bell-mouth, a cylindrical core arranged coaxially within said tubular member, the smaller said cylindrical end in sealing engagement with said cylindrical core, said tubular member formed with a cylindrical zone intermediate said frusto-conical zone and said larger cylindrical end, said cylindrical zone of smaller diameter than said bore to define an annular space between said bore and said cylindrical zone, said tubular member formed with a port communicating between said annular space and said bore adjacent said larger cylindrical end, said frusto-conical zone and said bell-mouth defining an annular flow passage, an annular sealing ring which is resiliently expansible circumferentially and is supported by said tubular member, said annular sealing ring adapted to engage said frusto-conical zone in a position adjacent said smaller cylindrical end, the radial thickness of the said annular sealing ring less than the radial spacing between said frusto-conical zone and the largest portion of said bell-mouth at the said position so that fluid can flow in either direction between the said annular sealing ring and the said largest portion of said bell-mouth, and said annular sealing ring adapted to move axially from said position towards said port in response to a pressure difference generated on the axial faces of the said annular sealing ring when fluid flows in the direction from said annular flow passage through said port, whereby said annular sealing ring will move axially with consequent circumferential expansion towards said bell-mouth due to the interaction between said frusto-conical zone and said annular sealing ring and will reduce the distance between said annular sealing ring and said bell-mouth to regulate the flow of fluid in the said direction.

8. A valve as in claim 7 comprising a body defining a valve seat and a second bore coaxial with said valve seat, said body further defining a passage provided with said valve seat, a fluid flow control valve comprising a stem and a head adapted sealingly to engage said valve seat, said stem coaxial with said second bore, said stem constituting said cylindrical core, said smaller cylindrical end of said tubular member supporting said stem for reciprocation relatively to said body, said stem adapted to be reciprocated whereby to move said head from a position in which said head sealingly engages said valve seat to a position in which said head is spaced from said valve seat to allow fluid to flow through said passage, the said tube arranged in sealing engagement with said second bore, the said cylindrical core adapted to be moved axially relatively to the said smaller cylindrical end, and said cylindrical core connected to said stem whereby said control valve is operable from within the said tube remote from said valve seat and said tubular member.

References Cited by the Examiner
UNITED STATES PATENTS

| | | | |
|---|---|---|---|
| 2,444,677 | 7/48 | Rosenblum | 138—45 |
| 2,481,482 | 9/49 | Green. | |
| 2,614,793 | 10/52 | Storm | 137—525 |

FOREIGN PATENTS

| | | |
|---|---|---|
| 245,607 | 7/63 | Australia. |
| 72,885 | 4/60 | France. |

MARTIN P. SCHWADRON, *Primary Examiner.*

M. CARY NELSON, *Examiner.*